United States Patent [19]
Capps

[11] Patent Number: 6,070,230
[45] Date of Patent: May 30, 2000

[54] MULTI-THREADED READ AHEAD PREDICTION BY PATTERN RECOGNITION

[75] Inventor: Don Capps, Plano, Tex.

[73] Assignee: Hewlett-Packard Company, Palo Alto, Calif.

[21] Appl. No.: 08/999,027

[22] Filed: Dec. 29, 1997

[51] Int. Cl.[7] .................................................. G06F 12/08
[52] U.S. Cl. ........................... 711/137; 711/213; 711/217
[58] Field of Search ..................................... 711/204, 213, 711/118, 217, 137

[56] References Cited

U.S. PATENT DOCUMENTS

| | | | |
|---|---|---|---|
| 5,287,487 | 2/1994 | Priem et al. | 395/425 |
| 5,357,618 | 10/1994 | Mirza et al. | 395/400 |
| 5,568,651 | 10/1996 | Medina et al. | 395/894 |
| 5,694,568 | 12/1997 | Harrison, III et al. | 395/414 |
| 5,822,790 | 10/1998 | Mehrotra | 711/213 |

*Primary Examiner*—Jack A. Lane

[57] ABSTRACT

The inventive prediction mechanism constructs a time ordered state space of the file accesses, and then searches the state space looking for file accesses that form either sequential or stride patterns. A cache is maintained to store information about existing patterns. The mechanism will review the cache to determine if a new access request is a continuation of an existing pattern before searching the entire state space for a new pattern. If the request is either a continuation of an existing pattern or forms a new pattern, then a read ahead is issued for the next block in the pattern. The cache and the state space are updated as each request arrives. The mechanism uses a trigger array to prevent the re-issuing of predictions. The mechanism also has a strength feature which is an indication how many times the pattern has been continued, and can be used by the operating system in deciding how many read aheads should be issued.

42 Claims, 2 Drawing Sheets

FIG. 2A

REQUESTS ARRIVING →

| 1 | 2 | 3 | 5 | 7 | 9 | 4 | |
|---|---|---|---|---|---|---|---|
| 0 | 0 | 0 | 0 | 0 | 0 1 | 0 2 | |
| 1 | 1 | 1 | 1 | 1 1 | 1 2 | 1 3 | |
| 2 | 2 | 2 | 2 1 | 2 2 | 2 3 | 2 5 | STATE |
| 3 | 3 | 3 1 | 3 2 | 3 3 | 3 5 | 3 7 | SPACE |
| 4 | 4 1 | 4 2 | 4 3 | 4 5 | 4 7 | 4 9 | |
| 5 1 | 5 2 | 5 3 | 5 5 | 5 7 | 5 9 | 5 4 | |

FIG. 2B

| | | | | | | | |
|---|---|---|---|---|---|---|---|
| 0 | 0 4,2,1 | 0 4,3,1 | 0 3,3,1 | 0 2,3,1 | 0 1,3,1 | 0 1,4,1 | |
| 1 | 1 | 1 | 1 | 1 4,7,2 | 1 4,9,2 | 1 3,9,2 | |
| 2 | 2 | 2 | 2 | 2 | 2 | 2 | CACHE |
| 3 | 3 | 3 | 3 | 3 | 3 | 3 | |
| 4 | 4 | 4 | 4 | 4 | 4 | 4 | |

CACHE ENTRIES: FIRST BLOCK INDEX, SECOND BLOCK, STRIDE

FIG. 3

| | | | | | | | |
|---|---|---|---|---|---|---|---|
| 0 | 0 4,2,1,1 | 0 4,3,1,2 | 0 3,3,1,2 | 0 2,3,1,2 | 0 1,3,1,2 | 0 1,3,1,3 | |
| 1 | 1 | 1 | 1 | 1 4,7,2,1 | 1 4,9,2,2 | 1 3,9,2,2 | |
| 2 | 2 | 2 | 2 | 2 | 2 | 2 | CACHE |
| 3 | 3 | 3 | 3 | 3 | 3 | 3 | |
| 4 | 4 | 4 | 4 | 4 | 4 | 4 | |
| 1 | 2 | 3 | 5 | 7 | 9 | 4 | |

REQUESTS ARRIVING →

CACHE ENTRIES: FIRST BLOCK INDEX, SECOND BLOCK, STRIDE, STRENGTH

6,070,230

MULTI-THREADED READ AHEAD PREDICTION BY PATTERN RECOGNITION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD OF THE INVENTION

This application relates in general to computer read ahead operations, and in specific to a mechanism for recognizing read patterns to allow read ahead operations to be used for both sequential and non-sequential accesses, as well as accesses by multithreaded applications.

BACKGROUND OF THE INVENTION

In modern computers the operating system attempts to predict the next section of a file that will be read in the near future. This prediction is then performed before the application requests the action. The section of the file that was predicted is brought into the computer's memory from disk, and hence is known as read ahead. Read ahead was developed to alleviate the time spent waiting to receive data blocks from disk. For example, if it costs X seconds for an application to issue a synchronous read, and wait until the data is retrieved from disk, then each time data is retrieved from disk, X seconds are added to the processing time. Consequently, by predicting which data blocks will be retrieved by the application, and issuing asynchronous read requests for the predicted data blocks, the application could continue to process existing data. And when the application requests its next block of the file it will tend to find that the next block is already in memory and the operation is completed much faster.

However, the prediction mechanism of the prior art is limited to positive sequences, i.e., it predicts whether the next block is one block greater than the last block that was read, e.g. file blocks 1, 2, 3, 4. Thus, if predicted, the prior art mechanism would have the operating system issue a read for the current block and issue an asynchronous read for the current block plus one. The prior art prediction mechanism is if the last block plus one equals the current block, then issue an asynchronous read for the next sequential block or the current block plus one. The OS or operating system maintains another data structure, typically called a v-node, that is associated with the file that the application is reading. The v-node is used by the OS to track the file. The v-node maintains a list of blocks that make up the file and their respective physical locations on the disk, as well as the last block read. Thus, the prediction mechanism consults the v-node for the file, and determines if the current request is equal to the last block read plus one. If so, it then issues a read for the current request and the asynchronous read for the next block and updates the last block read entry of the v-node to indicate the predicted request. For example, if the current request is for block 2, and the previous request was for block 1, then a read is issued for block 2 and an asynchronous read is issued for block 3. The last block read entry of the v-node is changed to block 3. If the current request is not equal to the previous plus one, then only a read is issued for the current request and no asynchronous request is issued. The last block entry of the v-node is changed to current request. For example, if the current request is for block 5, and the previous request was for block 1, then a read is issued for block 5 and the last block read entry of the v-node is changed to block 5. However, there are several problems with this approach, mainly because the prediction mechanism can only detect an application performing sequential block accesses, e.g. file blocks 1, 2, 3, 4, etc.

Note that the prediction mechanism cannot detect an application that reads backwards through the file, e.g. file blocks 6, 5, 4, 3, etc. This has been overcome by merely checking whether the current request is either plus or minus one of the previous read block.

Also note that the mechanism cannot detect an application performing accesses that are strided, e.g. file blocks 1, 3, 5, 7, etc. This problem has been overcome by modifying the v-node to maintain the last and the second last reads. Thus, the prediction mechanism checks to see if the current read request is as distant from the last block read, as the last block read is from the second last block read. If so, the application is predicted to read at a constant stride, and an asynchronous read is issued for the next block, which is one stride from the current block. For example, if the last block is block 3, and the second last block is block 1, and the current block is block 5, then the mechanism will compare block 5 to block 3, and determine a stride of 2, which is equal to the stride of block 3 from block 1. Then the OS will issue a read for block 5 and an asynchronous read for block 7. The last and second last blocks in the v-node will be updated to blocks 7 and 5, respectively. To detect an application that reads backwards with a stride through a file, e.g. file blocks 17, 15, 13, 11, the mechanism for plus or minus stride.

Moreover, if more than one application or more than one thread of a single application reads the same file at the same time then the prior art mechanism cannot detect either a sequence or a stride of blocks being read. For example, the prior art mechanism could not detect file blocks read in this order: 1, 100, 2, 101, where blocks 1 and 2 were requested by application A (or thread A of application C), and blocks 100 and 101 were requested by application B (or thread B of application C). This is because the v-node, which tracks the reads, is associated with the file and not the application or thread. Thus, as the applications or threads alternate, the pattern of entries in the v-node is disrupted. For example, suppose the last read is 100 and the second last is 1, when the current of 2 is compared with the last and the second to last, 2 is not sequentially after 100, and 2-100 equals a stride of −98, which does not equal the stride of +99 from 100-1. Thus, no patterns are detected, and no read aheads are issued. This negatively impacts the performance of those applications or threads. When no predictions are made then the operating system will not be able to accelerate the data into memory, and each application or thread in an application, will stall on each read waiting for the disk operation to complete. This problem will become more pronounced as the industry and consumers begin to use systems that comprise either multiple processes or applications which can utilize multiple threads.

The following is an example of a multi-threaded system and the problems it encounters using the prior art prediction mechanism. The system is a radar site that scans vertically at three levels, high (H), middle (M), and low (L), and feeds the data into a file. By vertically scanning, the site generates cross-section of the atmosphere in the form of a data stream of H-M-L-H-M-L-H-M-L-H-M-L, as the site scans and resets, scans and resets, etc. Now suppose the application wants to process the data for any given level, e.g. depict the high level or the low level. Thus, the application wants to read the data as H-H-H-H or L-L-L-L. Thus, the application requires the prior art stride reader because the distance between the records is a constant. However, if the application is multi-threaded, then it is likely to start one thread to process Hs, a second to process Ms, and a third to process Ls. Each thread is reading from the same file, at the same time, and are strided readers. As each thread reads from the file, the last and second last values in the v-node are reset accordingly, and therefore the prior art stride prediction mechanism will never recognize the reading patterns. Moreover, the prior art sequential reader will not pick up an H-M-L-H-M-L pattern, because the Hs may have different processing times from the Ms or the Ls, thus the pattern being read will not be H-M-L-H-M-L, but rather H-M-L-L-M-H-M-M-L etc. Thus, no predictions are possible, and each block of data is being read directly from disk. This may slow the system such that a single thread or process would have processed the data faster then having multiple threads or processes.

Note that moving the prediction mechanism from the file level to the process or thread level may overcome some of the problems discussed above, but introduces new problems which result in severely degraded performance. In this instance there will be three threads of the application, with one reading Hs, one reading Ms, and one reading Ls. As each thread is time switched across the CPU(s), their access requests will show that they are each stride readers. Thus, the OS will issue the requests to the disk as a series of Hs, then perhaps Ms and Ls. Reading the information from the disk this way will incur a large number of seeks as the disk skips over M and L data to read H data, and likewise for M and L data. Moreover, the OS has not recognized that at the file level it is actually a sequential reader, which would have been detected by a file level sequential prediction mechanism and performed many read aheads without seeks. Furthermore, the hard disk itself has a cache, which performs sequential read aheads, thus in reading block 1, blocks 2 and 3 are loaded in disk cache for faster retrieval. Thus, by not issuing sequential reads, and instead issued stride reads, this feature is disabled, and disk drive performance is reduced. So by moving the prediction mechanism to the application level, it will cost more seeks and reduce performance.

Note that the above problems are particularly relevant when the file is larger than the memory, and thus a portion of the file must reside on a hard disk or other mass storage medium, such as CD-ROM.

Therefore, there is a need in the prior art for a prediction mechanism that can recognize stride forward, stride backward, sequence forward, and sequence backward patterns hidden with a complex read patterns issued by multi-process or multi-thread systems, which make such patterns appear to be random accesses. Such a system would allow the operating system to accelerate the data on the path.

SUMMARY OF THE INVENTION

These and other objects, features and technical advantages are achieved by a system and method which constructs a time ordered state space of the file accesses, and then examines the state space looking for file accesses that conform to the rules for prediction. The first rule determines if there are blocks later in time an equal distance apart as previous stride accesses that were predicted. Thus, the inventive mechanism caches predictions and examines the cache on successive operations to detect a continuing pattern more quickly. The second rule determines if there are blocks later in time the same distance apart as the 2 blocks currently being evaluated. The third rule determines if there are blocks later in time 1 greater or less than the current block being examined in the state space. The first rule checks to see if the current request block is a logical continuation of an existing pattern. The second rule identifies stride readers and the third rule identifies sequential readers.

For example, assume an application requests or issues reads for file blocks 1, 2. This is the access behavior of an application that is reading a file with a sequential access behavior. The mechanism will determine that the entries satisfy the third rule and makes a prediction that block 3 will be read next and issues a read ahead for block 3. The mechanism will form a cache entry that defines the pattern. Assume that the application then requests block 3. This is the access behavior of an application that is continuing to read the file with a sequential access behavior. The mechanism will detect that this new entry satisfies the first rule and makes a prediction that block 4 will be read next and issue a read ahead for block 4. The mechanism will update the pattern cache for the new request.

Another example is where an application may request file blocks 9, 7, 5. This is the access behavior of an application that is reading a file with a stride access behavior. The mechanism will detect that the entries satisfy the second rule and issues a read ahead for block 3. The mechanism will form a cache entry that defines the pattern.

A further example is where an application is multi-threaded or operating on a system with multiple processes, wherein the sequence of read requests is 1, 9, 100, 2, 10, 101, 3, 11, 102, with one process reading blocks 1, 9, 100, another process reading blocks 2, 10, 101, and still another process reading blocks 3, 11, 102. Note that this tracks the radar example discussed previously. The mechanism will determine that blocks 1, 2, 3 satisfy the third rule, and issue a read ahead for block 4. The mechanism will also determine that blocks 9, 10, 11 satisfy the third rule, and issue a read ahead for block 12. The mechanism will also determine that blocks 100, 101, 102 satisfy the third rule, and issue a read ahead for block 103. Note that each process is effectively combining with the others to create a pattern of three sequential readers, however that each process is actually a stride reader. This arises when the application is reading a matrix in row order that was written in column order, and each process is responsible for processing a particular column. Therefore, by allowing the pattern to form in the state space, it is possible to detect cooperative file access patterns.

A technical feature of the inventive mechanism is a trigger array that is used to prevent the re-issuing of predictions. Whenever the mechanism makes a prediction, it marks the first element of the trend or pattern as "used for prediction". This is then later used to insure that no re-issues will be performed.

Another technical feature of the inventive mechanism is the strength of the prediction. Each time a continuation of an existing pattern is detected the strength is incremented. This information is collected so that it could be used to inform the operating system how aggressively to issue read-aheads.

A further technical feature of the inventive mechanism is the number of valid cache entries is maintained. This is used to reduce the number of cache entries that are to be searched when attempting to detect a continuation pattern.

A still further technical feature of the inventive mechanism is that when the state space becomes full, then the mechanism ages the state space by performing a logical shift of the contents of the state space and also a logical shift of the trigger indicators.

A still further technical feature of the inventive mechanism is that it is modular and portable, in that it can be combined with existing operating systems or written into new operating systems. The mechanism will work with most applications that exhibit stride and sequential access patterns.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIGS. 2A and 2B depict a progression of the state space and the pattern cache as a sequence of read requests are received from the application according to the flow diagram of FIG. 1; and FIG. 3 depicts a pattern cache similar to that of FIG. 2B and includes an entry defining the strength of a prediction.

DESCRIPTION OF THE PREFERRED EMBODIMENTS

Figure 1:
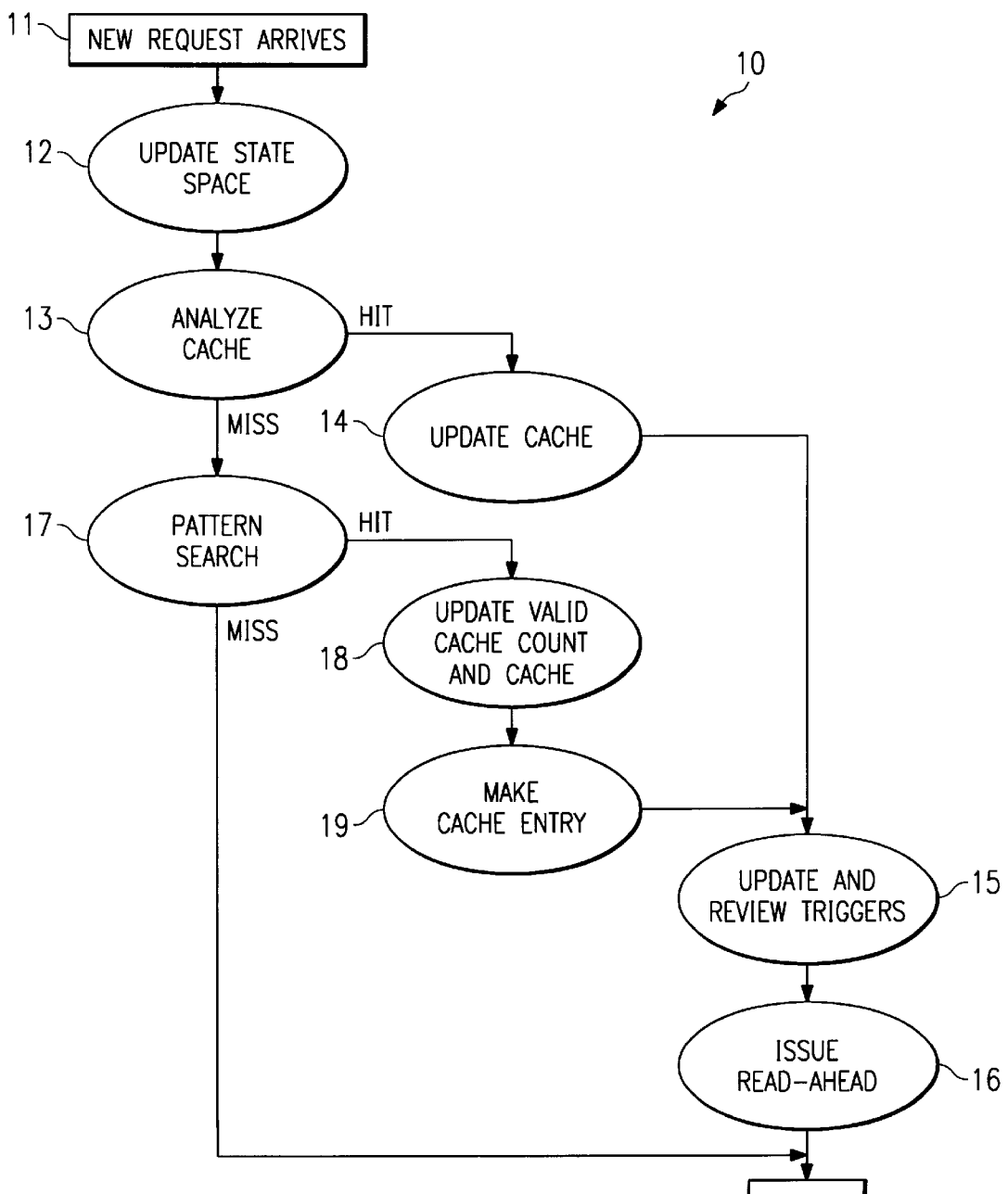
FIG. 1 depicts a flow diagram of the inventive prediction mechanism.

FIG. 1 depicts the flow diagram of the inventive prediction mechanism 10. As each new request 11 arrives, the state space is updated 12. The state space 20 is an array or stack which is used to maintain a list of the read requests issued by the application for data blocks stored on a hard disk or other storage medium. FIG. 2A depicts state space comprising five slots, which as shown are being filled over time with the requests 1, 2, 3, 5, 7, 9, and 4 are issued. After updating the state space 12, the pattern cache is analyzed 13 to determine if the new request fits any established patterns. FIG. 2B depicts the pattern cache 30 comprising five slots, the contents of which change over time as the requests 1, 2, 3, 5, 7, 9, and 4 are issued. The pattern cache 30 stores information about each detected pattern. The three values stored are first block state space index, second request block, and stride of the pattern. If the mechanism 10 determines that the new request is part of previously detected pattern, a pattern cache hit has occurred, and the cache is updated 14 to change the first block index and the second block entries for the pattern. Next the triggers are updated 15, and a read ahead is issued for predicted block, which is the new request block plus the stride of the recognized pattern.

The triggers or trigger array is a parallel array to the state space that is used to maintain flags which prevents multiple patterns from forming from the same block. The trigger array stores the state space index for first block of each pattern. Note that the first block (and hence the index) changes and is updated, as each continuing request of the pattern is received or as read aheads are issued for predicted blocks. For example, if the request sequence is 1, 2, 3, 5, 7, it contains two patterns, the first 1, 2, 3 and the second 1, 3, 5, 7. A forward sequence pattern will be identified from 1 and 2 with a read ahead issued for block 3. Thus, the first block of the sequence pattern is block 2, and consequently the stride pattern will be identified from 3, 5, 7, even though block 3 is a continuation of the sequence pattern. However, if the request sequence is 1, 2, 3, 4, 5, 7, then when block 4 is received, block 3 will become the first block of the sequence pattern, and thus block 3 cannot be used to determine a pattern of 3, 5, 7. Again note that only the index of the first block of the pattern is flagged in the trigger array. This also prevents re-issuing of a read aheads based upon a repeat of the same request sequence. The trigger array is updated to maintain the current first block index of each pattern.

After updating and reviewing the triggers, a read ahead is issued 16 and the mechanism has finished the operation initiated with this request.

Optionally, an additional feature called in_state_space reviews the state space before a read ahead is issued and prevents a read ahead from being issued for a block that is already in the state space. For example, as shown in FIG. 2A, when the request for block 4 is received, it will be found to be part of an existing forward sequence pattern, and a read ahead for the next block, here 5, would be issued. However, in_state_space will determine that block 5 is already in the state space, in slot 2, and thus a read has already been issued, and a read ahead does not have to be issued. Thus, each time a read ahead is going to be issued, the state space is reviewed, and if the block is not found, then the read ahead is issued.

If the mechanism 10 determines that the new request is not part of previously detected pattern, a pattern cache miss has occurred, and the state space is searched 17 to determine if the new request forms a pattern with other entries in the state space. If no pattern is found, or the pattern search has missed, then the mechanism is finished with this request. If a pattern is found, or the pattern search has hit, then any existing patterns in the cache are updated 18. The valid cache count is also updated 18, which keeps track of the number of entries in the cache. A new cache entry is made 19 for the new pattern, which is inserted into the cache. The cache entry details the first pattern block state space index, the second block of the pattern, and the stride of the pattern. Next the triggers are updated 15, and a read ahead is issued for the predicted block, which is the new request block plus the stride of the pattern, and the mechanism is finished with this request.

FIGS. 2A and 2B depict the progression of the state space and pattern cache as a series of requests are sent from the application. The first request is for block 1. The state space 20 is updated by placing block 1 in slot 5 of the state space. The cache is analyzed and block 1 is found not to be a continuation of a previous pattern. The state space is searched to determine if block 1 forms a pattern with other entries, and since there are no other entries, no patterns are found. Thus, the mechanism is finished with this request and a read request is issued for block 1.

The next block request for block 2 is received. The state space 20 is updated by placing block 2 in slot 5 of the state space, and moving block 1 to slot 4. The cache is analyzed and block 2 is found not to be a continuation of a previous pattern. The state space is searched and it is determined that block 2 forms a pattern with the block 1, specifically a forward sequence. Since the cache does not contain any other entries, there are no other cache entries to be updated. The mechanism forms a new pattern cache entry comprising the first block state space index that forms this pattern which is slot 4, the second block of the pattern or block 2, and the stride of the pattern or 1. Thus, the entry 4,2,1 is inserted into slot 0 of the cache. The trigger array is updated to indicate that block 1 has been used to form a pattern, and that an asynchronous request has been issued for block 3. The mechanism then issues an asynchronous request for block 3 and finishes the operation initiated by the request for block 2. Note that the read request for the requested block would be issued by the OS, the inventive mechanism either issues read aheads for predicted blocks that correspond to identified or existing patterns or could so instruct the OS to issue such read aheads.

Then the application requests block 3. The state space is updated by placing 3 in slot 5, and moving 2 and 1 to slots 4 and 3, respectively. The cache is analyzed and the mechanism determines that 3 is a continuation of a previously determined pattern. The mechanism makes this determination by noting that block 3 is equal to the second block, here 2, plus the stride of 1. The cache entry is updated so that the first block index is now 4 for block 2, as the mechanism only keeps the last two pieces of the pattern. The second block is now block 3, and the stride remains 1. The triggers are updated to indicate that an asynchronous request has been issued for block 4. Also, the trigger array is updated to indicate that block 2 is now the first block of the pattern. The mechanism then issues an asynchronous request for block 4 and finishes the operation initiated by the request for block 3. Note, that since an asynchronous request for block 3 has already been issued and such is indicated in the state space, no read request is issued for block 3.

The application then issues a request for block 5. The state space 20 is updated by placing block 5 in slot 5 of the state space, and moving 3, 2 and 1 to slots 4, 3 and 2, respectively. The cache is analyzed and block 5 is found not to be a continuation of the previous sequence pattern. The state space is searched to determine if block 5 forms a pattern with other entries, and none are found. Note that blocks 1, 3, and 5 will not form a pattern, since block 1 is marked in the trigger array as having been the original first block of the sequence pattern 1, 2, 3. The original block of a pattern cannot be used as a starting block of another pattern. Thus, the mechanism is finished with the operation initiated by this request and a read request is issued for block 5.

The next block request for block 7 is received. The state space 20 is updated by placing block 7 in slot 5 of the state space, and moving 5, 3, 2 and 1 to slots 4, 3, 2, and 1, respectively. The cache is analyzed and block 7 is found not to be a continuation of the sequence pattern. The state space is searched and it is determined that block 7 forms a pattern with the blocks 3 and 5, specifically a forward stride of 2. The cache entry for the sequence pattern is updated to reflect the new positions in the state space of elements of the pattern, specifically the first block index is now 2, the second block and stride remain 3 and 1 respectively. The mechanism forms a new pattern cache entry comprising the first block state space index that forms this pattern which is slot 4, the second block of the pattern or block 7, and the stride of the pattern or 2. Thus, the entry 4,7,2 is inserted into slot 1 of the cache. The trigger array is updated to indicate that block 3 has been used to form a pattern, and that an asynchronous request has been issued for block 9. The mechanism then issues an asynchronous request for block 9 and finishes the operation initiated by the request for block 7.

Then the application requests block 9. The state space is updated by placing 9 in slot 5, and moving 7, 5, 3, 2 and 1 to slots 4, 3, 2, 1, and 0, respectively. The cache is analyzed and the mechanism determines that 9 is a continuation of a previously determined pattern. The mechanism makes this determination by noting that block 9 is equal to the second block, here 7, plus the stride of 2. The cache entries are updated so that for entry 0, the first block index is 1, and second block and stride remain 3 and 1, respectively. For cache entry 1, the first block index is 4, and second block is 9, and stride remains 2. The triggers are updated to indicate that an asynchronous request has been issued for block 11. Also, the trigger array is updated to indicate that block 7 is now the first block of the pattern. The mechanism then issues an asynchronous request for block 11 and finishes the operation initiated by the request for block 9.

The application then requests block 4. The state space is updated by placing 4 in slot 5, and moving 9, 7, 5, 3, and to slots 4, 3, 2, 1, and 0, respectively. The cache is analyzed and the mechanism determines that 4 is a continuation of a previously determined pattern. The mechanism makes this determination by noting that block 4 is equal to the second block, here 3, plus the stride of 1. The cache entries are updated so that for entry 0, the first block index is 1 for block 3, and second block is 4 and the stride remains 1, respectively. For cache entry 1, the first block index is 3, and second block and stride remains 9 and 2, respectively. The triggers are updated to indicate that block 3 was used for prediction. The mechanism can optionally review the state space and would note that a request for block 5 has already been issued and is in the state space, and thus will not issue an asynchronous request for block 5. Thus, the mechanism is finished with the request for block 5.

Note that the pattern detection mechanism will detect a sequence with two entries, i.e. with entries of 1 and 2, it will predict 3. However for strides, it requires three entries before detection, i.e. 3, 5, 7 entries, it will predict 9. This is because sequential reads are defined as being two blocks that are one apart, while stride reads are those where the distance between A and B is the same as the distance between B and C, thus requiring three blocks A, B, and C, before detection.

Also note that when there is a pattern cache miss, meaning that a matching pattern does not exist, the entire state space is examined for all possible combination of blocks. This is an expensive operation, and thus the pattern cache reduces the need for a pattern search with every new entry. The pattern search with the request order of 1, 2, 3, 5, 7, 9, and 4 of FIGS. 2A and 2B is as follows. Assume that the pattern search is being conducted when the request for the block 4 arrives, thus the state space holds 4, 9, 7, 5, 3, and 2 in slots 5 to 0 respectively. The search places three markers, Ma, Mb, and Mc at slots of the state space, with the initial position of Ma at slot 5, Mb is at the oldest slot in the state space or slot 0, and Mc is at Mb+1, which is the second oldest slot, or slot 1. After the first comparison, where a match occurs if Ma-Mc equals Mc-Mb, then Mc is moved by one slot, and another comparison is made. This continues until after Mc reaches slot 4, whereupon Mb is moved by one slot and Mc is set to Mb+1, and the search continues until Mb is at slot 3 and Mc is at slot 4, which indicates that the state space has been completely searched.

The search would yield the following sequences (Ma, Mc, Mb): (4,3,2), (4,5,2), (4,7,2), (4,9,2), (4,5,3), (4,7,3), (4,9,3), (4,7,5), (4,9,5), and (4,9,7). The first sequence (4,3,2) indicates a forward sequence with a stride of 1, meaning that 2 then 3, then 4 where placed into the state space. Thus, the search has iterated through all possible permutations looking for any possible combination of three blocks that are equal distances apart. This is why the search is expensive and why the cache is needed. However, note the search is not a full N cubed search. This is because Ma is set to the most recent entry of the state space and is not moved during the search. A search with Ma being set to block 9 (or 7, 5, 3, or 2) would have taken place earlier, and thus there is no need to repeat such a search. Also the search is conducted in one direction only, there is no need to progress upward through the state space. The search also keeps track of the number of entries in the state space via a valid cache count, thus empty slots are not searched. And lastly once a match is found, the search is halted, thus in the above example, the search would have been halted after the first sequence was searched. The search checks if there are any two blocks that are a stride distance of 1 apart, either positive or negative, and checks if there are any three blocks that are equal distances apart, either positive or negative.

Note that the state space and the cache are depicted as six slots and 5 slots, respectively for simplicity sake, other sizes could be used. Moreover, it is particularly advantageous to taylor the sizes to fit a particular number of cache lines in the process. This way the space and the pattern cache will fit in the on chip cache of the process, and memory will not be used for this evaluation. For example, a fifteen slot state space having unsigned elements will occupy four cache lines. With a state space of two, sequentiality can be detected. With a state space of four, 2 simultaneous sequential readers that are in different locations in the file can be detected. Note that by having fifteen state slots, with three blocks to make a pattern, then the at most five patterns will exist in the state space, thus the pattern cache should hold five patterns. Note that the number of patterns can be set according to the number of parallel processes or the number of parallel threads an application can have simultaneously operating.

FIG. 3 depicts another embodiment of the inventive prediction mechanism. FIG. 3 depicts the pattern cache of FIG. 2B, but with an additional entry that represents the strength of the prediction. When predictions are made, and subsequently proven correct, then future predictions can be viewed as being more likely to occur or stronger. Thus, whenever a pattern is recognized, the strength is set to one. However, each time the mechanism detects a continuation of pattern, then the strength is increased by one. Thus, after a request for block 3 arrives, the strength of the sequential pattern is increased to 2. After the request for block 4 arrives, the strength is increased to 3. When the request for block 9 arrives, the strength of the stride pattern is increased to 3.

The strength can be used by the operating system in deciding how many blocks to read ahead. For example, if the strength is 50, then the operating system may issue a read ahead for the next 500 blocks that fit the pattern. This reduces the latency overhead of issuing asynchronous read aheads one at a time. This is critical when the processing time is less than an asynchronous read time, and would prevent a process or thread from starving.

Although the present invention and its advantages have been described in detail, it should be understood that various changes, substitutions and alterations can be made herein without departing from the spirit and scope of the invention as defined by the appended claims.

What is claimed is:

1. A method for predicting a subsequent block of data that will be requested by an application operating with multiple streams of execution, based upon a current request and at least one previous request, the method comprising the steps of:

identifyng two previous application requests, thereby generating two identified previous requests;

detecting whether a stride pattern exists between the current request and said two identified previous requests;

repeating said steps of identifying and detecting for a plurality of combinations of two previous application requests wherein said plurality of combinations includes combinations of requests separated by unequal intervals in a sequence of stored requests, thereby enabling detection of stride patterns having entries separated by uneven intervals in said sequence of stored requests and multiple simultaneous interleaved stride patterns; and predicting the subsequent block based upon results of the step of repeating.

2. The method of claim 1, further comprising the step of:

issuing an asynchronous read ahead for the subsequent block.

3. The method of claim 1, further comprising the step of:

detecting whether a sequential pattern exists between the current request and said two identified previous requests.

4. The method of claim 3, wherein:

the sequential pattern is a forward sequence.

5. The method of claim 3, wherein:

the sequential pattern is a backward sequence.

6. The method of claim 1, further comprising the steps of:

reading each request into a state space; and storing information about each detected pattern into a cache.

7. The method of claim 6, wherein the step of detecting comprises the steps of:

analyzing the cache to determine whether the current request is a continuation of any existing patterns; and searching the state space, if the step of analyzing determines that the current request is not the continuation of any existing patterns, to determine whether the current request forms a pattern with any previous requests.

8. The method of claim 7, wherein the step of analyzing comprises the steps of:

comparing the current request to the last previous request plus a stride for each pattern in the cache.

9. The method of claim 7, wherein the step of searching comprises the steps of:

setting a first marker at the current request in the state space;

setting, initially, a second marker at the oldest request in the state space;

setting, initially, a third marker at the next to oldest request in the state space;

comparing a first difference of the blocks indicated by the first marker and the third marker to a second difference of the blocks indicated by the third marker and the second marker to determine whether the first difference equals the second difference;

moving at least one of the second and third markers to at least one other position in the state space;

repeating the steps of comparing and the steps of moving for the entire state space; and wherein a pattern is located when the first difference equals the second difference.

10. The method of claim 9, wherein the step of searching further comprises the step of:

halting the step of searching when a pattern is located.

11. The method of claim 7, further comprising the step of:

storing information regarding the subsequent block in a trigger array to prevent re-issuing an read ahead for the subsequent block.

12. The method of claim 11, wherein the step of analyzing determines that the current request is the continuation of an existing pattern, the step of detecting further comprises the steps of:

updating the cache to include information about the current request;

determining the subsequent block of the pattern by summing the current request and the stride of the existing pattern;

reviewing the trigger array to determine whether an asynchronous read ahead has previously been issued for the subsequent block;

updating the trigger array if an asynchronous read ahead has not previously been issued for the subsequent block; and issuing an asynchronous read ahead for the subsequent block if an asynchronous read ahead has not previously been issued for the subsequent block.

13. The method of claim 11, wherein the step of searching determines that the current request forms a new pattern with at least one previous request, the step of detecting further comprises the steps of:

updating a valid cache count to increase a number of existing patterns;

inserting a new cache entry into the cache which includes information about the new pattern;

determining the subsequent block of the new pattern by summing the current request and the stride of the new pattern;

reviewing the trigger array to determine whether an asynchronous read ahead has previously been issued for the subsequent block;

updating the trigger array if an asynchronous read ahead has not previously been issued for the subsequent block; and issuing an asynchronous read ahead for the subsequent block if an asynchronous read ahead has not previously been issued for the subsequent block.

14. The method of claim 13, wherein:

the new cache entry include a first block state space index, a second block value, and the new pattern stride.

15. The method of claim 13, wherein:

the new cache entry includes a strength value which indicates a number of continuations of the new pattern that have been determined by the step of analyzing;

wherein the strength value is used by an operating system to determine an amount of asynchronous read aheads that should be issued based upon the new pattern.

16. The method of claim 1, wherein:

said multiple streams of execution are multiple processes.

17. The method of claim 1, wherein:

said multiple streams of execution are multiple threads.

18. The method of claim 1, wherein said step of repeating comprises:

repeating said steps of identifying and detecting for all possible combinations of two previous application requests.

19. A system for predicting a subsequent block of data that will be requested by an application operating with multiple streams of execution, based upon a current request and at least one previous request, the system comprising:

means for identifying two previous application requests, thereby generating two identified previous requests;

means for detecting whether a stride pattern exists between the current request and said two identified previous requests;

means for repeating said steps of identifying and detecting for a plurality of combinations of two previous application requests, wherein said plurality of combinations includes combinations of requests separated by unequal intervals in a sequence of stored requests, thereby enabling detection of stride patterns having entries separated by uneven intervals in said sequence of stored requests and multiple simultaneous interleaved stride patterns; and means for predicting the subsequent block based upon results of the means for repeating.

20. The system of claim 19, further comprising:

means for issuing an asynchronous read ahead for the subsequent block.

21. The system of claim 19, further comprising:

means for detecting whether a sequential pattern exists between the current request and the said two identified previous requests.

22. The system of claim 21, wherein:

the sequential pattern is a forward sequence.

23. The system of claim 21, wherein:

the sequential pattern is a backward sequence.

24. The system of claim 19, further comprising:

state means for storing each request; and cache means for storing information about each detected pattern.

25. The system of claim 24, wherein the means for detecting comprises:

means for analyzing the cache means to determine whether the current request is a continuation of any existing patterns; and means for searching the state means, if the means for analyzing determines that the current request is not the continuation of any existing patterns, to determine whether the current request forms a pattern with any previous requests.

26. The system of claim 25, wherein the means for analyzing comprises:

means for comparing the current request to the last previous request plus a stride for each pattern in the cache means.

27. The system of claim 25, wherein the means for searching comprises:

a first marker set at the current request in the state means;

a second marker initially set at the oldest request in the state means;

a third marker initially set at the next to oldest request in the state means;

means for moving at least one of the second and third markers to at least one other position in the state means; and means for comparing a first difference of the blocks indicated by the first marker and the third marker to a second difference of the blocks indicated by the third marker and the second marker to determine whether the first difference equals the second difference;

wherein the means for comparing and moving operate for the entire state means, and a pattern is located when the first difference equals the second difference.

28. The system of claim 27, wherein:

the means for searching is halted when a pattern is located.

29. The system of claim 28, further comprising:

trigger means for storing information regarding the subsequent block to prevent re-issuing an asynchronous read ahead for the subsequent block.

30. The system of claim 29, wherein the means for analyzing determines that the current request is the continuation of an existing pattern, the means for detecting further comprises:

means for updating the cache means to include information about the current request;

means for determining the subsequent block of the pattern by summing the current request and the stride of the existing pattern;

means for reviewing the trigger means to determine whether an asynchronous read ahead has previously been issued for the subsequent block;

means for updating the trigger means if an asynchronous read ahead has not previously been issued for the subsequent block; and means for issuing an asynchronous read ahead for the subsequent block if an asynchronous read ahead has not previously been issued for the subsequent block.

31. The system of claim 29, wherein the means for searching determines that the current request forms a new pattern with at least one previous request, the means for detecting further comprises:

means for updating valid cache count to increase a number of existing patterns;

means for inserting a new cache entry into the cache means which includes information about the new pattern;

means for determining the subsequent block of the new pattern by summing the current request and the stride of the new pattern;

means for reviewing the trigger means to determine whether an asynchronous read ahead has previously been issued for the subsequent block;

means for updating the trigger means if an asynchronous read ahead has not previously been issued for the subsequent block; and means for issuing an asynchronous read ahead for the subsequent block if an asynchronous read ahead has not previously been issued for the subsequent block.

32. The system of claim 31, wherein:

the new cache entry include a first block state means index, a second block value, and the new pattern stride.

33. The system of claim 31, wherein:

the new cache entry includes a strength value which indicates a number of continuations of the new pattern that have been determined by the means for analyzing;

wherein the strength value is used by an operating system to determine an amount of asynchronous read aheads that should be issued based upon the new pattern.

34. The system of claim 19, wherein:

said multiple streams of execution are multiple processes.

35. The system of claim 19, wherein:

said multiple streams of execution are multiple threads.

36. The system of claim 19, wherein said means for repeating comprises:

means for repeating said steps of identifying and detecting for all possible combinations of two previous application requests.

37. A method for identifying a pattern of memory block accesses by an application, the method comprising the steps of:

storing a plurality of memory blocks requested by an application in an initial order, thereby establishing an plurality of initially stored memory blocks;

selecting a combination of at least two memory blocks from said plurality of stored memory blocks, thereby establishing a selected combination of blocks;

searching for a stride pattern in said selected combination of blocks;

repeating said steps of selecting and searching, for a plurality of combinations of memory blocks, wherein said plurality of combinations of memory blocks includes combinations of memory blocks separated by unequal intervals in said plurality of initially stored memory blocks, thereby enabling detection of stride patterns having entries separated by unequal intervals in said plurality of initially stored memory blocks; and identifying a stride pattern in said plurality of initially stored memory blocks based upon the step of repeating.

38. The method of claim 37, wherein the initial order is an order in which memory blocks were requested by the application.

39. The method of claim 37, wherein the step of storing comprises the step of:

storing in a state space.

40. The method of claim 37, wherein the step of selecting comprises the step of:

placing a marker at each of at least two memory blocks of said initially stored memory blocks, thereby establishing at least two marked memory blocks, employing at least two markers;

and the step of searching comprises the step of:

searching for a stride pattern among said at least two marked memory blocks.

41. The method of claim 40, comprising the further steps of:

moving one marker of said at least two markers to another memory block of said plurality of initially stored memory blocks, thereby establishing a modified set of at least two marked memory blocks; and searching for a stride pattern among said modified set of at least two marked memory blocks.

42. The method of claim 41, comprising the further step of:

repeating said steps of moving and searching for a stride pattern among said modified set of at least two marked memory blocks until all permutations of at least two memory blocks in said plurality of initially stored memory blocks have been searched for a stride pattern, thereby enabling detection of a plurality of multi-threaded stride patterns simultaneously present in said plurality of initially stored memory blocks.

* * * * *